(12) United States Patent
Frank et al.

(10) Patent No.: US 12,066,007 B2
(45) Date of Patent: Aug. 20, 2024

(54) FLOATING WIND TURBINE BLADE PITCH ADJUSTMENT FOR WAVE ACTIVITY

(71) Applicant: Siemens Gamesa Renewable Energy A/S, Brande (DK)

(72) Inventors: Jared Frank, Longmont, CO (US); Srinivas Guntur, Boulder, CO (US); Marco Masciola, Louisville, CO (US)

(73) Assignee: Siemens Gamesa Renewable Energy A/S, Brande (DK)

( * ) Notice: Subject to any disclaimer, the term of this patent is extended or adjusted under 35 U.S.C. 154(b) by 4 days.

(21) Appl. No.: 17/770,768

(22) PCT Filed: Oct. 22, 2020

(86) PCT No.: PCT/EP2020/079779
§ 371 (c)(1),
(2) Date: Apr. 21, 2022

(87) PCT Pub. No.: WO2021/078873
PCT Pub. Date: Apr. 29, 2021

(65) Prior Publication Data
US 2022/0412309 A1    Dec. 29, 2022

Related U.S. Application Data

(63) Continuation of application No. 16/664,567, filed on Oct. 25, 2019, now Pat. No. 11,306,700.

(51) Int. Cl.
*F03D 7/02* (2006.01)
*F03D 9/30* (2016.01)

(52) U.S. Cl.
CPC ............. *F03D 7/0224* (2013.01); *F03D 9/30* (2016.05)

(58) Field of Classification Search
CPC .. F03D 9/30; F03D 7/0224; F03D 7/042–047; B63B 2035/446; F05B 2240/93; F05B 2270/331; F05B 2270/342
See application file for complete search history.

(56) References Cited

U.S. PATENT DOCUMENTS

| 7,400,055 | B2 | 7/2008 | Nagao |
| 10,107,259 | B2* | 10/2018 | Kristoffersen ........ F03D 7/0224 |
| 2006/0066111 | A1 | 3/2006 | Suryanarayanan |

(Continued)

FOREIGN PATENT DOCUMENTS

EP    2469083 A2    6/2012

OTHER PUBLICATIONS

Han, Yanqing et al: "Stability and dynamic response analysis of a submerged tension leg platform for offshore wind turbines"; Ocean Engineering; vol. 129; pp. 68-82; XP029866604; Nov. 22, 2016; ISSN: 0029-8018; DOI: 10.1016/J.OCEANENG.2016.10.048.

(Continued)

*Primary Examiner* — Courtney D Heinle
*Assistant Examiner* — Andrew Thanh Bui
(74) *Attorney, Agent, or Firm* — Schmeiser, Olsen & Watts, LLP

(57) ABSTRACT

Provided is a method, computing system, and computer program product for reducing floating wind turbine loads induced by ocean waves by adjusting a blade pitch angle of at least one rotor blade of a floating wind turbine to minimize a moment imbalance at a platform top of the floating wind turbine caused by ocean wave activity.

19 Claims, 9 Drawing Sheets

(56) References Cited

U.S. PATENT DOCUMENTS

| | | | |
|---|---|---|---|
| 2007/0110578 A1 | 5/2007 | Stommel | |
| 2011/0204636 A1 | 8/2011 | Scholte-Wassink et al. | |
| 2011/0316277 A1* | 12/2011 | Skaare | F03D 7/043 |
| | | | 290/44 |
| 2013/0209254 A1* | 8/2013 | Hess | F03D 7/043 |
| | | | 416/1 |
| 2020/0378357 A1* | 12/2020 | Louazel | F03D 9/25 |
| 2021/0123414 A1 | 4/2021 | Frank et al. | |
| 2023/0025543 A1* | 1/2023 | Skaare | F03D 13/25 |

OTHER PUBLICATIONS

Feike, Savenije et al: "Control development for floating wind"; Journal of Physics: Conference Series, Institute of Physics Publishing, Bristol; GB; vol. 524; No. 1; Jun. 16, 2014; pp. 12090; XP020266254; ISSN: 1742-6596; DOI: 10.1088/1742-6596/524/1/012090.
International Search Report & Written Opinion for PCT/EP2020/079779 mailed on Feb. 5, 2021.

* cited by examiner

FLOATING WIND TURBINE BLADE PITCH ADJUSTMENT FOR WAVE ACTIVITY

CROSS-REFERENCE TO RELATED APPLICATIONS

This application claims priority to PCT Application No. PCT/EP2020/079779 having a filing date of Oct. 22, 2020, which claims priority to U.S. application Ser. No. 16/664,567, having a filing date of Oct. 25, 2019, the entire contents both of which are hereby incorporated by reference.

FIELD OF TECHNOLOGY

The following relates to embodiments of blade pitch adjustment for floating wind turbines, and more specifically to embodiments of a method for reducing loads induced by ocean waves on floating wind turbine towers.

BACKGROUND

Floating wind turbines experience environmental disturbances that are induced from different sources, like turbulence, aeroelastic effects, and ocean waves. The loads caused by ocean waves contribute a significant portion of the overall floating wind turbine cost. Conventional methods address fatigue loads at the wind turbine/floating platform interface by over-designing the connection components or by curtailing extraction of energy available in the environment, but these methods add complexity and cost to floating wind turbine tower construction and operation.

SUMMARY

An aspect relates to a method for reducing floating wind turbine loads induced by ocean waves. A blade pitch angle of at least one rotor blade of a floating wind turbine is adjusted to minimize a moment imbalance at a platform top of a floating wind turbine caused by ocean wave activity.

In an exemplary embodiment, the method includes calculating an error signal based on the moment imbalance measured between a tower bottom moment and a thrust moment. The tower bottom moment is a moment at a platform top of the floating wind turbine as a result of environmental loads, and the thrust moment is a moment defined by a thrust force of rotor blades of the floating wind turbine measured at a location on the shaft of the floating turbine proximate the platform top.

In an exemplary embodiment, the method includes filtering the error signal using a bandpass filter in a frequency range attributable to ocean wave activity to obtain a filtered error signal. The filtering isolates wave excitation frequencies from the error signal that are in the frequency range defined by an ocean wave spectrum. The blade pitch angle is adjusted according to a pitch offset signal converted from the filtered error signal. The pitch offset signal is converted from the filtered error signal by calculating a difference between an actual pitch angle value of at least one rotor blade and a desired blade pitch angle of at least one rotor blade, wherein the difference defines the pitch offset signal.

Another aspect relates to a method for reducing loads induced by ocean waves on a floating wind turbine. A processor of a computing system calculates an error signal defined by a moment imbalance between a tower bottom moment and a thrust moment of the floating wind turbine. The error signal is filtered in a frequency range attributable to ocean wave activity to eliminate frequencies contributing to the error signal that are not attributable to ocean wave activity, resulting in a filtered error signal. The filtered error signal is converted to a pitch offset signal. A blade pitch angle of at least one rotor blade of the floating wind turbine is adjusted according to the pitch offset signal.

In an exemplary embodiment, the error signal comprises frequencies attributable to one or more of: turbulence due to wind above sea level, ocean wave activity, ocean current variability, vortex induced vibrations, structural resonances, electrical grid phenomena, and normal turbine operations. Moreover, the error signal is filtered using a bandpass filter tuned to filter out frequencies above or below the frequency range attributable to ocean wave activity; the frequency range attributable to ocean wave activity is defined by an ocean wave frequency spectrum in a range of approximately 0.03 Hz to 0.25 Hz.

In an exemplary embodiment, the filtered error signal is converted to the pitch offset signal includes calculating a difference between an actual pitch angle value of at least one rotor blade and a desired blade pitch angle of at least one rotor blade, wherein the difference defines the pitch offset signal. By way of example, the pitch offset signal is calculated from the filtered error signal according to a function with the following properties: a term proportional to a current value of the filtered error signal, a term proportional to a time integral of the filtered error signal, and a term proportional to a time derivative of the filtered error signal Another aspect relates to a computer system, comprising: a processor, a memory device coupled to the processor, a pitch controller coupled to the processor, and a computer readable storage device coupled to the processor, wherein the storage device contains program code executable by the processor via the memory device to implement a method for reducing loads induced by ocean waves on a floating wind turbine tower.

Another aspect relates to a computer program product, comprising a computer readable hardware storage device storing a computer readable program code, the computer readable program code comprising an algorithm that when executed by a computer processor of a computing system implements a method for reducing loads induced by ocean waves on a floating wind turbine tower.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Figure 1:
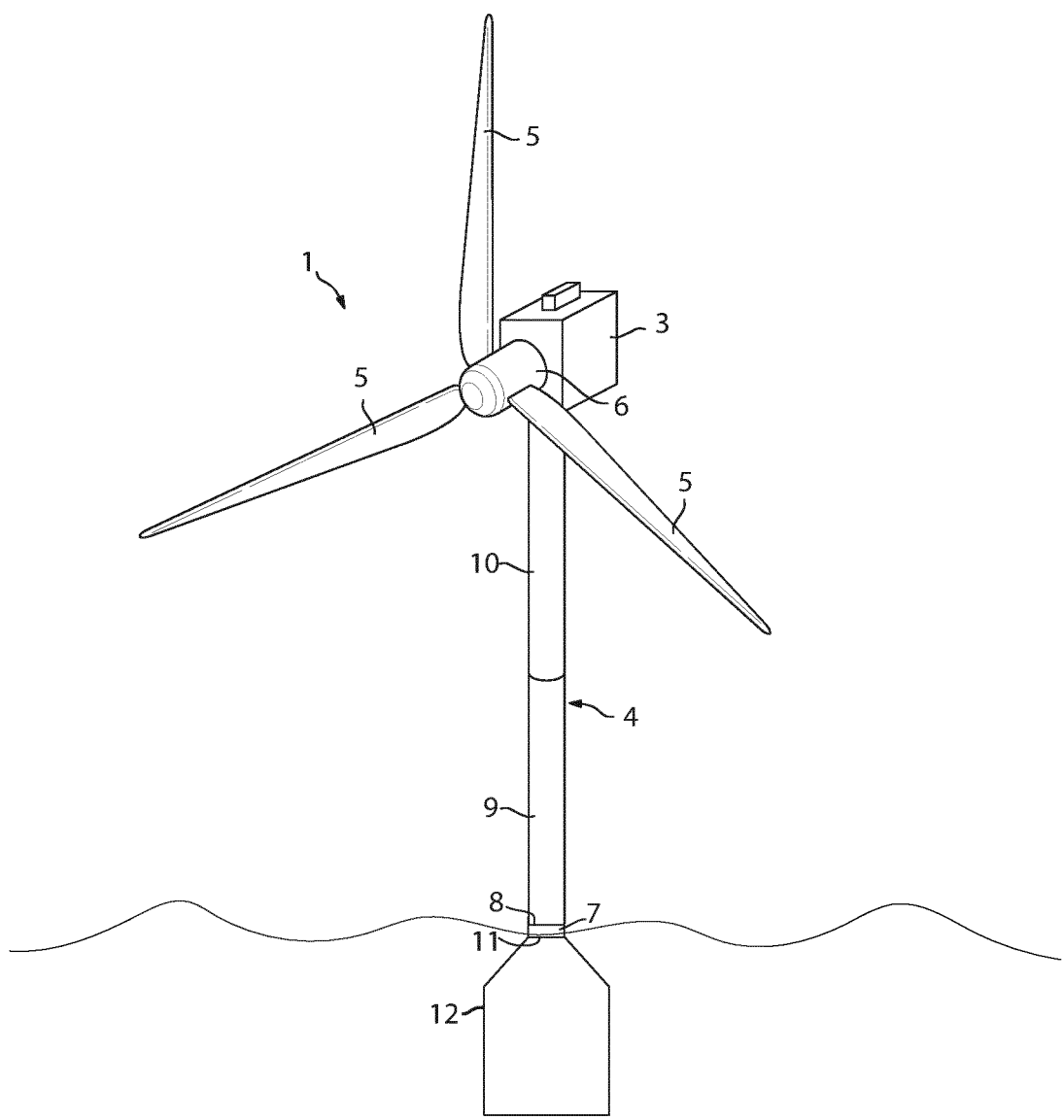
FIG. 1 depicts a schematic view of a floating wind turbine, in accordance with embodiments of the present invention.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

In brief overview, floating wind turbine towers experience loads from many environmental sources, such as wind and ocean waves. Ocean wave activity, particularly those that the submerged portion of the platform top of the floating wind turbine is subjected to, result in loads that must be counteracted for proper operation and structural integrity of the floating wind turbine. Rather than counteracting the ocean wave loads by designing a more robust platform top, which adds to the cost, weight, and complexity of the structure, embodiments of the present invention reduce the floating platform loads induced by ocean waves by regulating and/or adjusting a blade pitch angle of one or more rotor blades of the floating wind turbine. Adjusting the blade pitch angle of the rotor blades can mitigate a floating wind turbine tower-bottom bending moment and floating platform interface fatigue loads. For instance, adjusting the blade pitch angle of at least one rotor blade can minimize a moment imbalance at a platform top of the floating wind turbine tower caused by ocean wave activity.

A moment imbalance on the floating wind turbine tower bottom is a difference between a measured tower bottom moment and a moment created by a rotor thrust force measured at the shaft, or alternatively, at a blade root (i.e. thrust moment). The tower bottom moment is a moment at the platform top of the floating wind turbine tower as a result of environmental loads, and the thrust moment is a moment defined by a thrust force of rotor blades of the floating wind turbine tower measured at a location of a shaft of the floating turbine tower proximate the platform top. The difference between the tower bottom moment and the thrust moment is calculated and output as an error signal by a control mechanism (i.e. computing system). Because the error signal contains disturbances related to both ocean activity and other disturbances not a result from ocean activity, the error signal is filtered by the control mechanism to isolate the frequencies associated with ocean activity, known as "wave excitation frequencies." The error signal is filtered using a filter, such as a bandpass filter, in a frequency range defined by an ocean wave spectrum. The ocean wave spectrum is the frequency range where ocean waves are observed to exist. In this way, the filtered error signal focuses only on the effects of ocean wave activity. The filtered error signal of the imbalance is then converted to a pitch offset signal that is used by the control mechanism to adjust a blade pitch angle of the rotor blades. Accordingly, the moment imbalance is counteracted by pitch control of the blades so that the tower bottom moment and the thrust moment cancel each other out, thereby reducing and/or eliminating loads against the platform top of the floating wind turbine tower induced by ocean waves.

Referring now to the drawings, FIG. 1 depicts a schematic view of a floating wind turbine 1, in accordance with embodiments of the present invention. The floating wind turbine 1 includes one or more rotor blades 5 that connect to a hub 6 of the floating wind turbine 1. The hub 6 is connected to a nacelle 3 that is atop a wind turbine tower 4. The wind turbine tower 4 may be constructed in multiple sections, such as tower section 9 and tower section 10, or may be a single tower section. The tower 4 extends from the nacelle 3 to a transition piece 7; the location where a tower bottom 8 meets a platform top 11 is called a transition piece or transition section 7. A platform hull 12 is located proximate or at the surface of the water and extends below the surface of the water. The platform hull 12 is designed to float in the water while supporting the floating wind turbine 1 at offshore locations. Although shown schematically in FIG. 1 as comprising a single base structure, the platform hull 12 can be constructed of other known configurations. For example, multiple base structures that are configured to support the floating wind turbine tower 1 in the ocean, a semisubmersible, or a tension leg platform (TLP).

The floating wind turbine 1 experiences loads induced by wave activity and other environmental factors. In particular, ocean waves exert forces against the platform top 11 which lead to undesirable performance of the floating wind turbine 1 if not properly mitigated. A computing system, such as a pitch control mechanism, is operably coupled to the floating wind turbine tower 1 for regulating and/or controlling blade pitch angles of the rotor blades. In a first exemplary embodiment, the computing system is one or more remote servers servicing components of the floating wind turbine 1, such as an onboard pitch controller. In a second exemplary embodiment, the computing system is an onboard computer located internally to the floating wind turbine 1. The computing system includes components performed remotely and onboard the floating wind turbine. By way of example, low-level controllers responsible for quick and fundamental decisions affecting the second-by-second performance of the motors/hydraulics/etc. can be implemented onboard the floating wind turbine because communication delays/dropouts/faults in the network would require the turbine to shut down, while software is run on remote servers located at the wind parks that execute some high level processing and decision making (e.g., deciding whether to enable/disable different functions based on weather conditions, etc.).

The computing system reduces floating wind turbine tower loads induced by ocean waves by adjusting a blade pitch angle of at least one rotor blade 5 of a floating wind turbine 1 to minimize a moment imbalance at the transition piece 7 between the platform top 11 and the tower bottom 8 of the floating wind turbine 1 caused by ocean wave activity. Further, the computing system is part of a blade pitch control system described in great detail infra.

Figure 2:
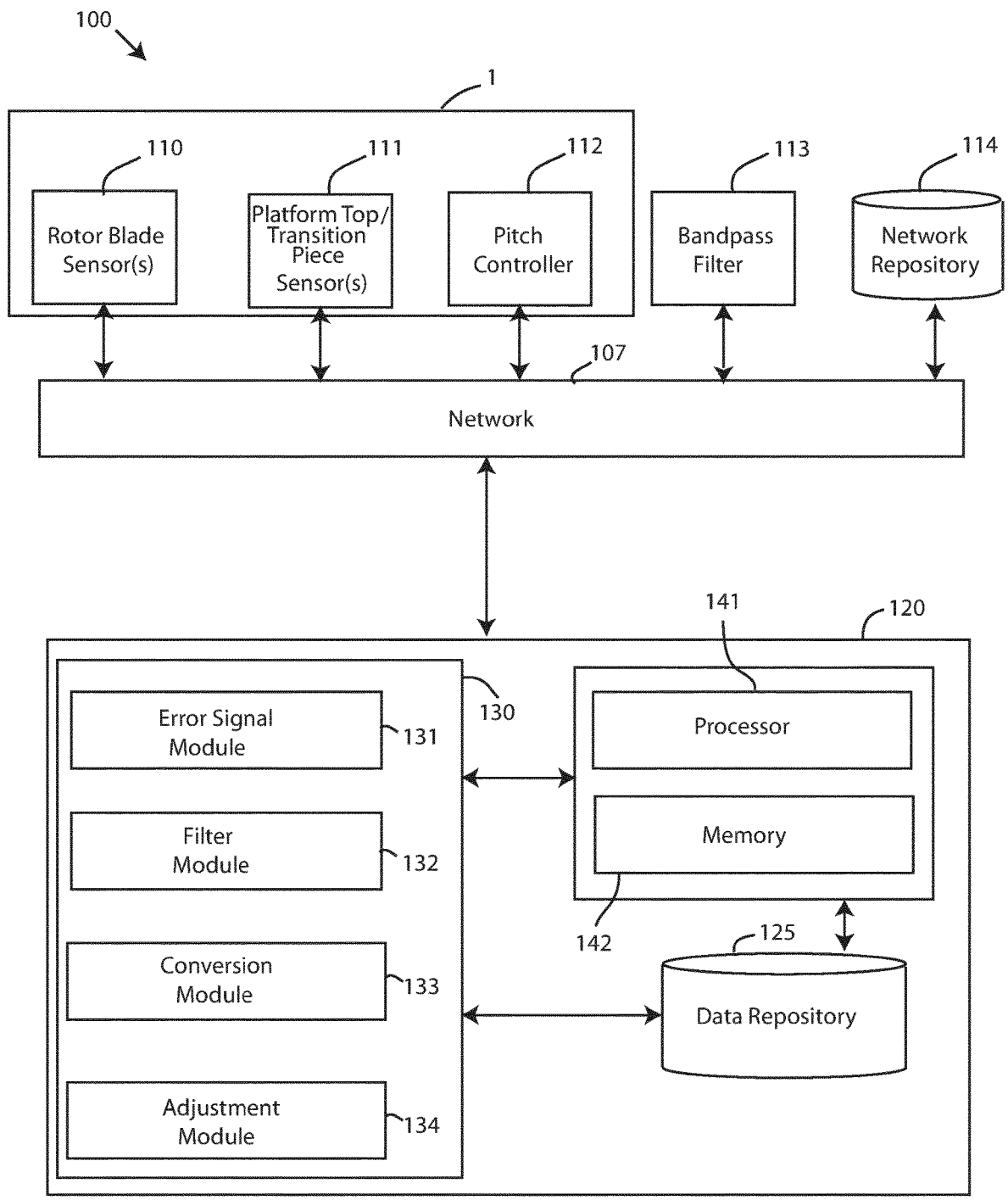
FIG. 2 depicts a block diagram of a blade pitch control system, in accordance with embodiments of the present invention.

FIG. 2 depicts a block diagram of blade pitch control system 100, in accordance with embodiments of the present invention. The blade pitch control system 100 is a system for regulating blade pitch angles of rotor blades of a floating wind turbine tower to counteract a moment imbalance of the floating wind turbine caused by ocean wave activity. The blade pitch control system 100 may be alternatively referred to as a pitch control mechanism, a load mitigation system, a floating wind turbine tower system, a pitch regulator for floating wind turbines, a load reduction system, and the like. Moreover, the blade pitch control system 100 includes a computing system 120. The computing system 120 can be a computer system, a computer, a server, one or more servers, a backend computing system, and the like. The blade pitch control system 100 depicted in FIG. 2 refers to embodiments where the computing system 120 is remote from the floating wind turbine tower 1.

Furthermore, the blade pitch control system 100 includes the floating wind turbine 1 and a bandpass filter 113 that are communicatively coupled to the computing system 120 over a network 107. For instance, information/data is transmitted to and/or received from the floating wind turbine tower 1 and the bandpass filter 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of floating wind turbines, blade pitch angle data, load data, environmental condition data, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the information of floating wind turbines, blade pitch angle data, load data, environmental condition data, etc., and the like, to generate both historical and predictive reports regarding a blade pitch angle adjustment. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The floating wind turbine 1 includes at least one rotor blade sensor 110, at least one transition piece or platform top sensor 111, and a pitch controller 112. The transition piece sensor 111 can be located either in the tower bottom 8 or the platform top 11. The rotor blade sensor(s) 110 measures thrust force of the rotor blades and the platform top/transition piece sensor 111 measures forces acting on the platform top 11 and/or the transition piece 7 of the floating wind turbine 1. Examples of the sensors 110 and 111 include strain gauges, Fiber Bragg grating sensors (FBGS, accelerometers, piezoelectric sensors, and the like. The pitch controller 112 is responsible for sending commands to the rotor blades for adjusting the blade pitch angle of the rotor blades. In an exemplary embodiment, the pitch controller 112 is a proportional-integral-derivative (PID) controller. The pitch controller 112 includes other modules that control pitch damage attenuation, speed regulation, etc.

Figure 3:
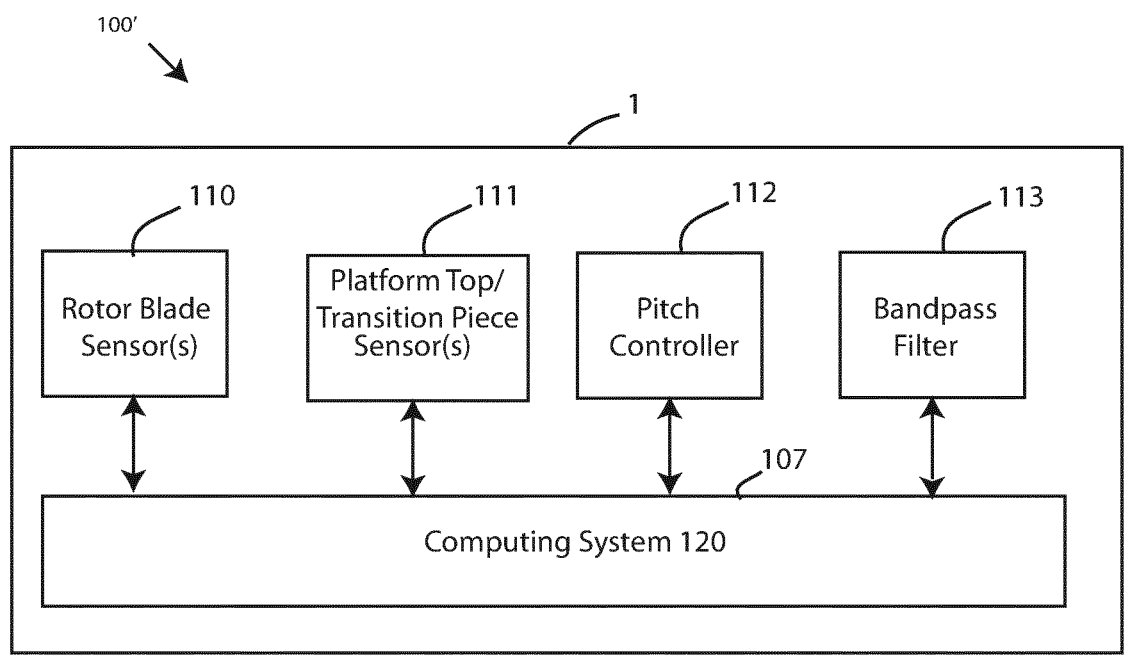
FIG. 3 depicts a block diagram of an alternative blade pitch control system, in accordance with embodiments of the present invention.

FIG. 3 depicts a block diagram of an alternative blade pitch control system 100', in accordance with embodiments of the present invention. The blade pitch control system 100' depicted in FIG. 3 refers to embodiments where the computing system 120 is an onboard computer of the floating wind turbine tower 1.

The computing system 120 of the blade pitch control system 100, 100' is equipped with a memory device 142 which stores various data/information/code, and a processor 141 for implementing the tasks associated with the blade pitch control system 100, 100'. A blade pitch angle adjustment application 130 is loaded in the memory device 142 of the computing system 120. The blade pitch angle adjustment application 130 can be an interface, an application, a program, a module, or a combination of modules. In an exemplary embodiment, the blade pitch angle adjustment application 130 is a software application running on computing system 120.

Referring back to FIG. 2, the blade pitch angle adjustment application 130 of the computing system 120 includes an error signal module 131, a filter module 132, a conversion module 133, and an adjustment module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

Figure 4:
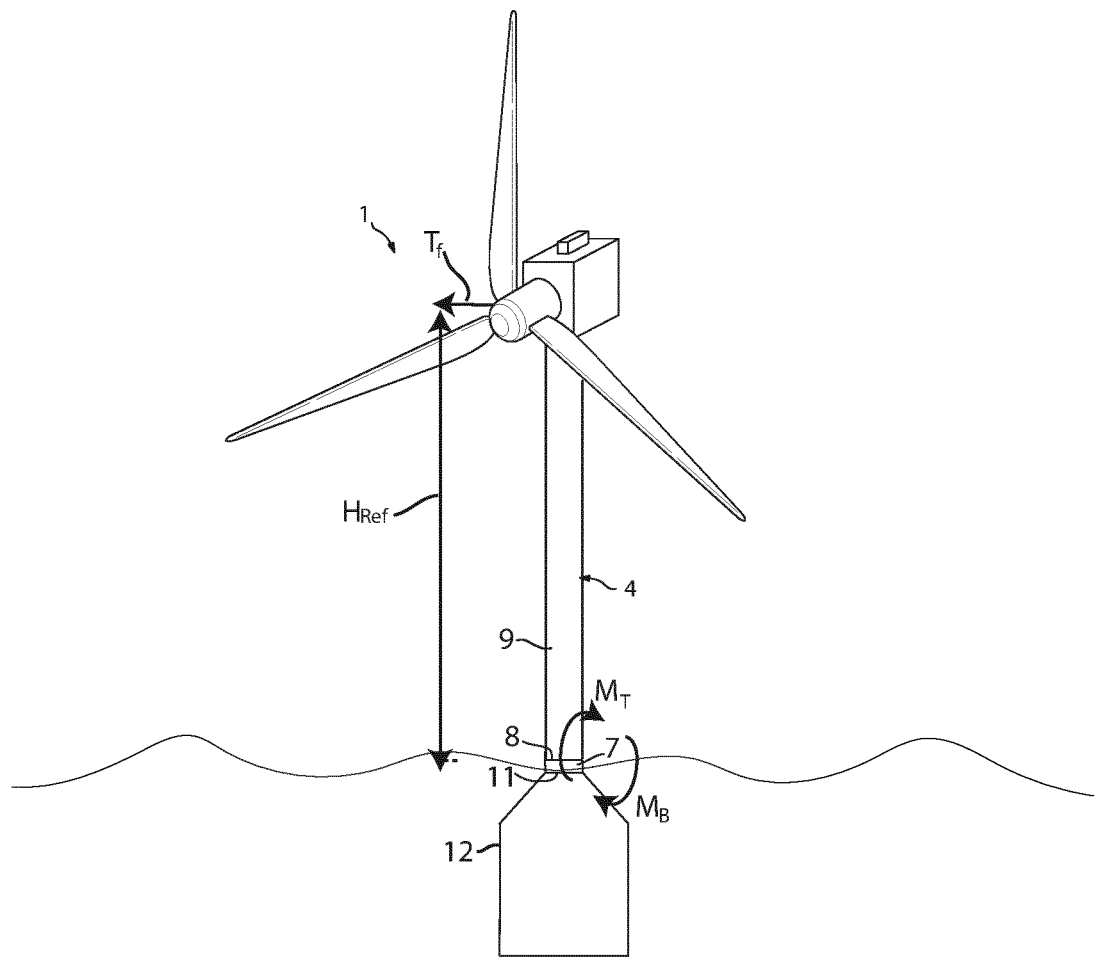
FIG. 4 depicts a schematic view of the floating wind turbine of FIG. 1, showing a thrust moment and a tower bottom moment, in accordance with embodiments of the present invention.

The error signal module 131 includes one or more components of hardware and/or software program code for calculating an error signal defined by a moment imbalance between a tower bottom moment and a thrust moment of the floating wind turbine. FIG. 4 depicts a schematic view of the floating wind turbine 1 of FIG. 1, showing a thrust moment $M_T$ and a tower bottom moment $M_B$, in accordance with embodiments of the present invention. The tower bottom moment $M_B$ is a moment at the transition piece 7/platform top 11 of the floating wind turbine 1 as a result of environmental loads. The value of the tower bottom moment $M_B$ is measured by the platform top/transition piece sensor 111 or can be estimated from other data received from other sensors (e.g. strain gauge). The thrust moment $M_T$ is a moment defined at a location at a tower section 4 of the floating wind turbine 1 proximate the platform top 11 and transition piece 7, computed from a thrust force $T_F$ of rotor blades of the floating wind turbine measured by the rotor blade sensors 110. The thrust moment $M_T$ is defined as the thrust force $T_F$ multiplied by a distance or height $H_{Ref}$ of the tower measured from the transition piece 7 (i.e. $H_{Ref} \times T_F$).

The moment imbalance is thus the difference between the thrust moment $M_T$ and the tower bottom moment $M_B$. The error signal ε is calculated by the error signal module 131 in response to the computing system 120 receiving or obtaining the values of the thrust force $T_F$ and the tower bottom moment $M_B$, in accordance with the following equation: $\varepsilon = M_B - (H_{Ref} \times T_F)$. The error signal ε comprises frequencies attributable to various disturbances, including ocean wave activity. For instance, the error signal comprises frequencies attributable to one or more of: turbulence due to wind above sea level, ocean wave activity, ocean current variability, vortex induced vibrations, structural resonances, electrical grid phenomena, normal turbine operations, and the like. The frequencies in the error signal that are not attributable to ocean wave activity are unwanted for the purposes of counteracting the moment imbalance specifically due to ocean wave activity. Therefore, the unwanted signals are filtered out of the error signal.

Figure 5:
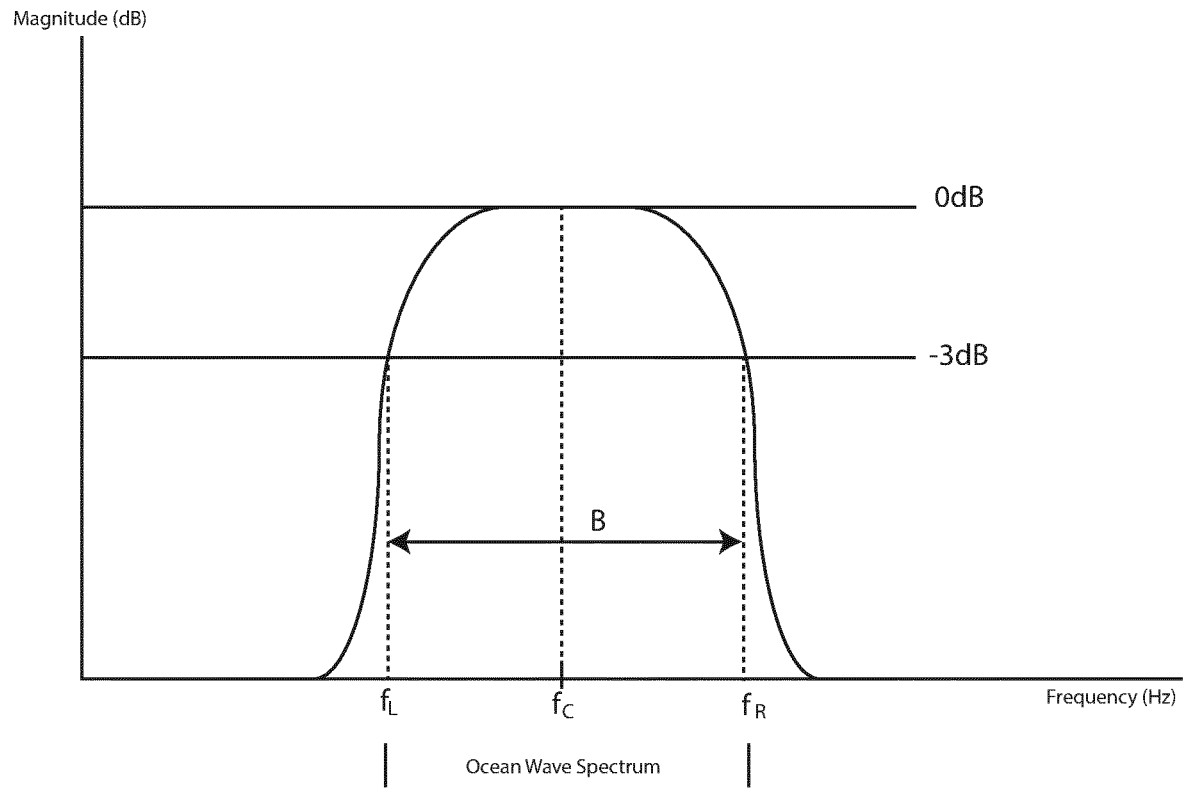
FIG. 5 graphically depicts the error signal being filtered so that frequencies only within the range of the ocean wave spectrum pass while the frequencies outside the ocean wave spectrum are stopped.

The filter module 132 includes one or more components of hardware and/or software program code for filtering the error signal in a frequency range attributable to ocean wave activity to eliminate frequencies contributing to the error signal that are not attributable to ocean wave activity. The frequencies that are not attributable to ocean wave activity are filtered out to ensure that the computed error signal c and resulting blade pitch offset (Δβ) calculated by the computing system 120 respond specifically to ocean wave activity while remaining relatively insensitive to the various other disturbances, which are either deemed negligible or compensated for by other modules of the blade pitch control system. The filtering by the filter module 132 results in a filtered error signal. The filter module 132 filters the error signal using a bandpass filter tuned to filter out frequencies above or below the frequency range attributable to ocean wave activity. The frequency range used corresponds to the ocean wave spectrum. In an exemplary embodiment, the ocean wave frequency spectrum is in a range of approximately 0.03 Hz to 0.25 hz. Thus, the filter module 132 isolates wave excitation frequencies from the error signal that are in the frequency range defined by an ocean wave spectrum, as shown schematically in FIG. 5. FIG. 5 graphically depicts the error signal being filtered so that frequencies only within the range of the ocean wave spectrum pass while the frequencies outside the ocean wave spectrum are stopped. In the illustrated embodiment, the range of the ocean wave spectrum is defined between a left frequency $f_L$ limit and a right frequency limit $f_R$; a center frequency is shown as $f_C$. B is the passband, the frequency range passed by the filter which is set to be the ocean wave spectrum, 0 dB is pure passing and −3 dB is the point where the input signal is considered completely filtered out, and thus output by the filter module 132 as a filtered error signal. The filtered error signal is then converted to a pitch offset signal.

Referring back to FIG. 2, the conversion module 133 includes one or more components of hardware and/or software program code for converting the filtered error signal to a pitch offset signal. For instance, the conversion module 133 converts the filtered error signal into a pitch offset signal (Δβ) representing a difference to be applied to the actual blade pitch angle, β. In other words, the conversion module 133 converts the filtered error signal to the pitch offset signal by calculating a difference between an actual pitch angle of at least one rotor blade and a desired blade pitch angle of at least one rotor blade, wherein the difference defines the pitch offset signal. By way of example, if one of the blades currently has a blade pitch angle of 3°, and the filtered error signal suggests that the blade pitch angle of the blade should be adjusted to 3.25°, the offset pitch signal is then the blade pitch 0.25°. Each rotor blade may have a different actual blade pitch angle so the conversion of the filtered error signal to the pitch offset signal may have a different value with respect to each blade.

The conversion from the error signal to the pitch offset is based on three terms: a value of the error itself, scaled by some amount $k_p$ (proportional), how much the error is building up over time, approximated using a time integral of the error signal, scaled by some amount $k_i$ (integral), and how much the value of the error is changing, approximated using a time derivative of the error signal, scaled by some amount $k_d$ (derivative). The scales $k_p$, $k_i$, $k_d$ are used to adjust how much each term contributes to the final adjustment to the pitch offset Δβ:

$$\Delta \beta = k_p \cdot \varepsilon + k_i \int \varepsilon dt + k_d \frac{d\varepsilon}{dt}$$

In an exemplary embodiment, the pitch offset signal is calculated from the filtered error signal according to a function with terms proportional to a current value of the filtered error signal, a time integral of the filtered error signal, and a time derivative of the filtered error signal.

The adjustment module 134 includes one or more components of hardware and/or software program code for adjusting a blade pitch angle of at least one rotor blade of the floating wind turbine according to the pitch offset signal. For instance, the adjustment module 134 sends instructions to the pitch controller 112 of the floating wind turbine 1 to adjust a blade pitch angle of one or more rotor blades. Continuing with the above example, if the pitch offset signal is 0.25°, the adjustment module 134 sends instructions to the pitch controller 112 to adjust the blade pitch angle of one of the blades by 0.25°. The adjustment module 134 adjusts the blade pitch angle of each rotor blade independently of the other blades. In an exemplary embodiment, the adjustment module 134 adjusts the blade pitch angle for all of the rotor blades according to a pitch offset signal unique to the particular blade. In another exemplary embodiment, the adjustment module 134 adjusts the blade pitch angle for only one of the rotor blades or two of the three rotor blades according to a pitch offset signal unique to the blades selected for adjustment.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the blade pitch control system 100, 100' uses specific hardware, such as pitch controllers, wind turbine components, sensors, to calculate a pitch offset signal to counteract a moment induced by ocean wave activity of a floating wind turbine. The rotor blades of the floating wind turbine are physically moved to change a blade pitch angle of the blades to minimize the moment imbalance of the floating wind turbine towers which is a practical application of a technical solution that improves the efficiency of the floating wind turbine and allows for the floating wind turbine to be designed with less material cost, using the blade pitch control system 100, 100' to counteract a moment imbalance as opposed to modifying the structural configuration of the platform hull and the floating wind turbine tower.

Figure 6:
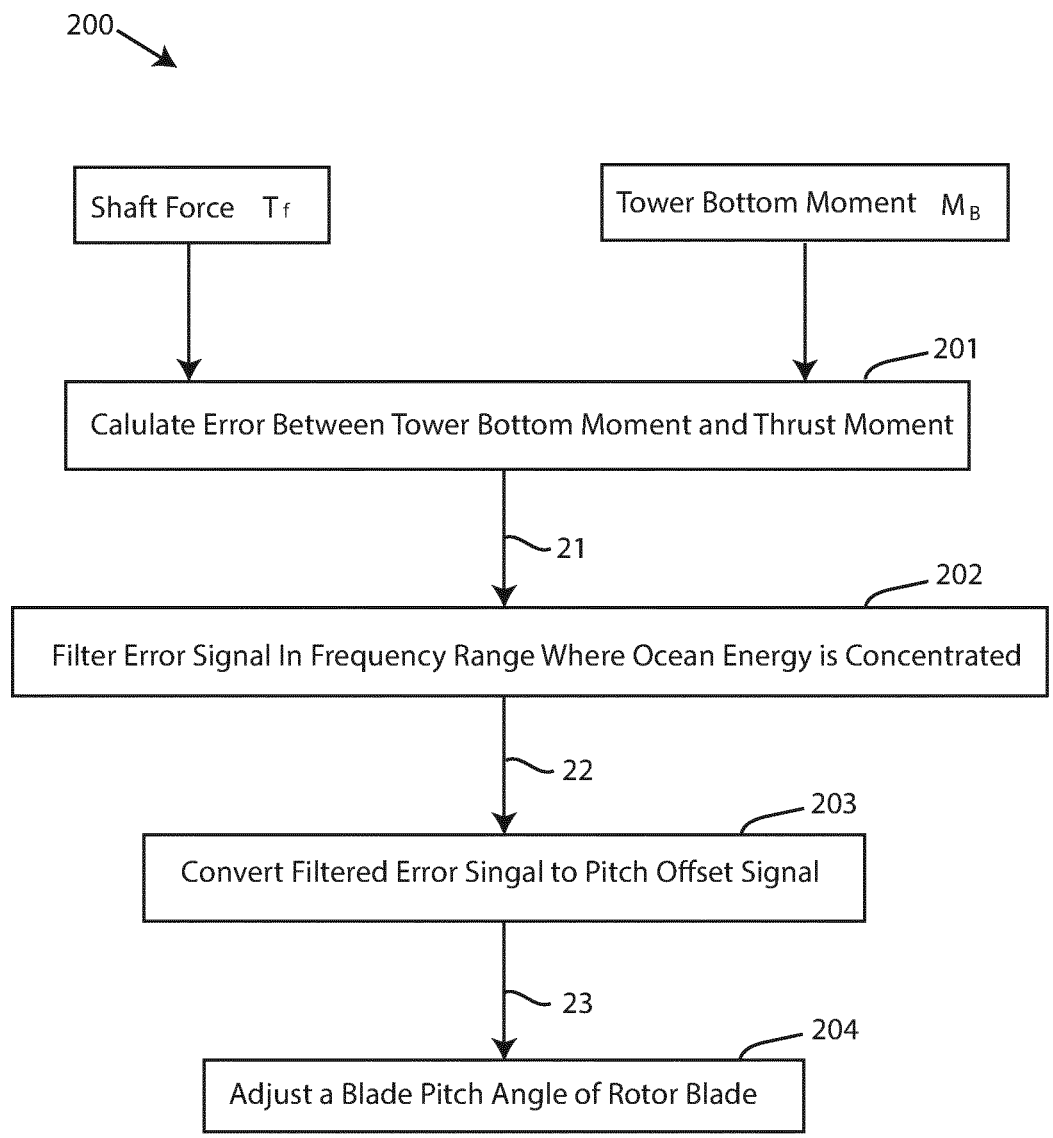
FIG. 6 depicts a flow chart of a method for reducing loads induced by ocean waves on a floating wind turbine, in accordance with embodiments of the present invention.

Referring now to FIG. 6, which depicts a flow chart of a method 200 for reducing loads induced by ocean waves on a floating wind turbine, in accordance with embodiments of the present invention. One embodiment of a method 200 or algorithm that may be implemented for reducing loads induced by ocean waves on a floating wind turbine with the blade pitch control system 100, 100' described in FIGS. 1-5 using one or more computer systems as defined generically in FIG. 9 below, and more specifically by the specific embodiments of FIGS. 2-3.

Embodiments of the method 200 for reducing loads induced by ocean waves on a floating wind turbine, in accordance with embodiments of the present invention, may begin with receiving the shaft thrust force $T_f$ and the tower bottom moment $M_B$ values. The shaft thrust force $T_f$ and the tower moment $M_B$ values may be measured by one or more sensors of the floating wind turbine, in which the sensor data is transmitted to the computing system 120. The shaft thrust force $T_f$ is used in combination with the length or height $H_{ref}$ of the tower measured between the rotor blades and the transition section 7 where the tower section meets the platform top 111 to calculate the thrust moment $M_T$. Step 201 calculates an error between the tower bottom moment $M_B$ and the thrust moment $M_T$. The output of step 201 is the error signal 21 representing the moment imbalance occurring at the transition piece 7 of the floating wind turbine tower 1. Step 202 filters the error signal 21 in a frequency range where ocean energy is concentrated to eliminate unwanted frequencies associated with disturbances not attributable to ocean wave activity. In an exemplary embodiment, a custom bandpass filter is used that is configured to isolate wave excitation frequencies from the error signal 21 that are in the frequency range defined by an ocean wave spectrum. The output of step 202 is the filtered error signal 22. The filtered error signal 22 is a signal having a frequency that represents a moment, although other units can be used depending on the custom bandpass filter used. Step 203 converts the filtered error signal 22.

Figure 7:
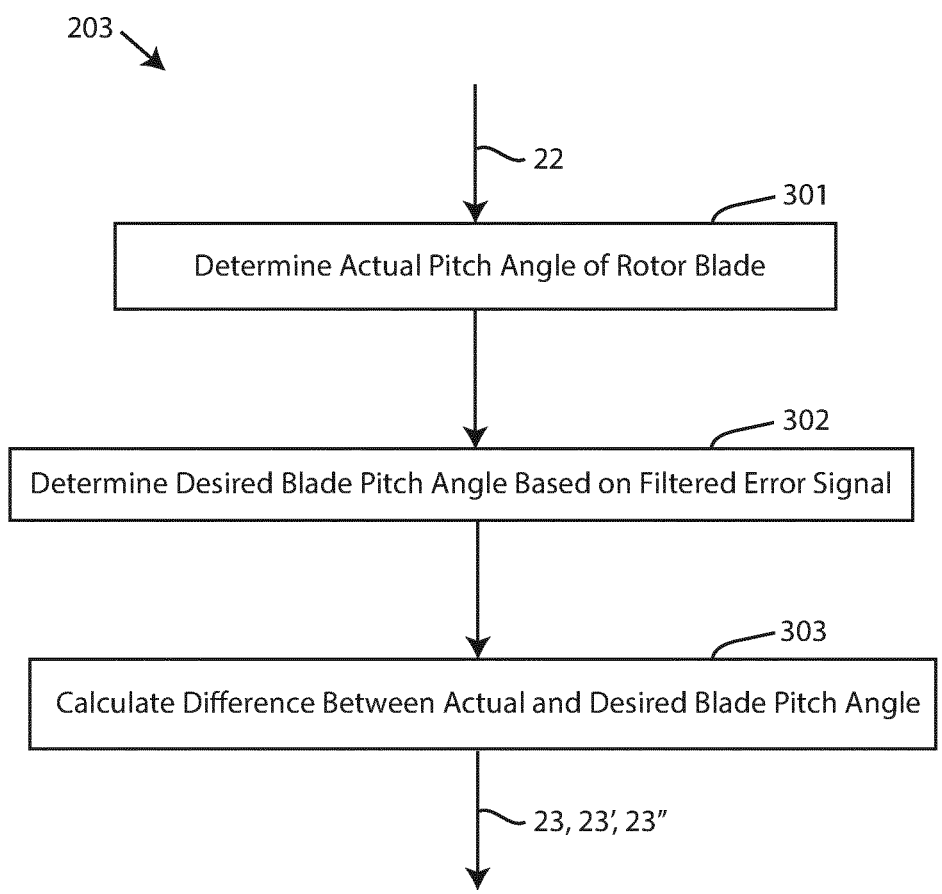
FIG. 7 depicts a flowchart of a converting step of the method for reducing loads induced by ocean waves on a floating wind turbine, in accordance with embodiments of the present invention.

FIG. 7 depicts a flowchart of the converting step 203 of the method 200 for reducing loads induced by ocean waves on a floating wind turbine, in accordance with embodiments of the present invention. Step 301 determines an actual blade pitch angle of at least one rotor blade. Using the filtered error signal 22, step 302 determines a desired blade pitch angle of the at least one rotor blade. Step 303 calculates a difference between the actual blade pitch angle of the at least one rotor blade and the desired blade pitch angle of the at least one rotor blade to obtain a pitch offset signal 23 for adjusting the blade pitch angle of the at least one rotor blade. The converting step 203 can be done for one, some, or all of the rotor blades. The output of the converting step 203 is a pitch offset signal 23 and potentially pitch offset signals for additional rotor blades 23', 23". Referring back to FIG. 6, step 204 adjusts the blade pitch angle of one or more rotor blades according to the pitch offset signals 23, 23', 23".

Figure 8:
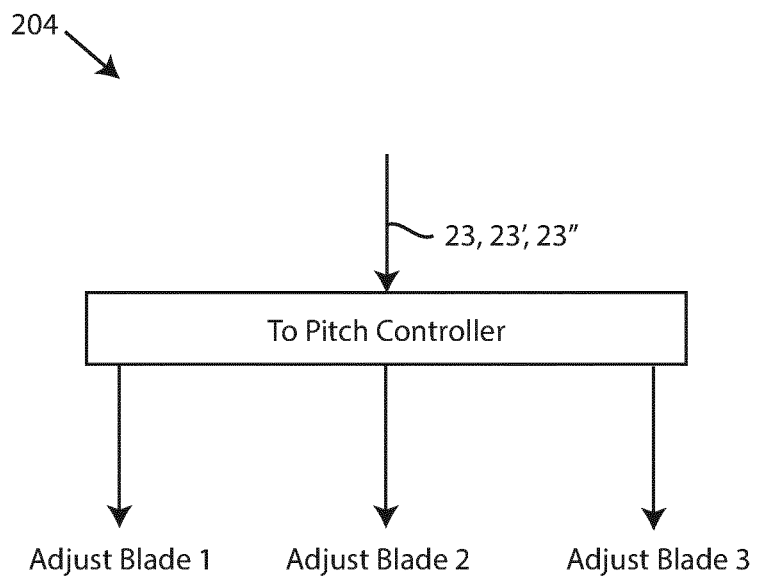
FIG. 8 depicts a schematic block diagram of the blade pitch angle adjustment of the method for reducing loads induced by ocean waves on a floating wind turbine, in accordance with embodiments of the present invention.

FIG. 8 depicts a schematic block diagram of the blade pitch angle adjustment of the method 200 for reducing loads induced by ocean waves on a floating wind turbine, in accordance with embodiments of the present invention. The pitch offset signals 23, 23', 23" are transmitted to a pitch controller of the floating wind turbine that controls the pitch of the rotor blades. The pitch controller adjusts the blade pitch angle of "Blade 1" according to pitch offset signal 23. The pitch controller adjusts the blade pitch angle of "Blade 2" according to pitch offset signal 23'. The pitch controller adjusts the blade pitch angle of "Blade 3" according to pitch offset signal 23". By way of example, if the pitch offset signal 23 is 0.24°, then "Blade 1" is adjusted 0.24° from a current blade pitch angle position. Likewise, if the pitch offset signal 23' is 0.37° and the pitch offset signal 23" is 0.15°, then "Blade 2" is adjusted 0.37° from a current blade pitch angle position and "Blade 3" is adjusted 0.15° from a current blade pitch angle position.

Accordingly, method 200 counteracts the moment imbalance of the floating wind turbine tower by regulating the pitch control of the blades so that the tower bottom moment and the thrust moment cancel each other out, thereby reducing and/or eliminating a transfer of loads from the platform hull 12 to the platform top 11 induced specifically by ocean waves.

Figure 9:
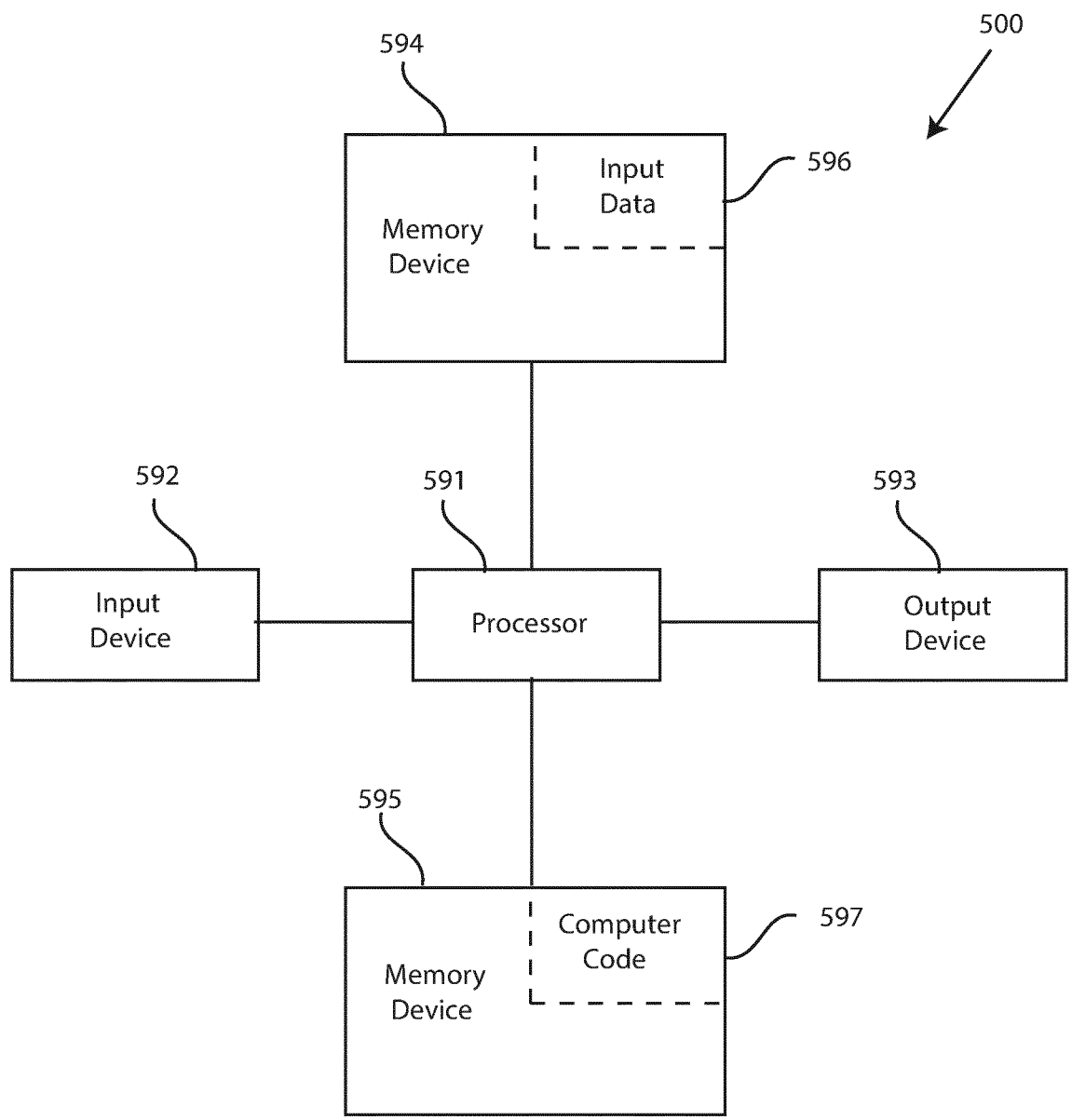
FIG. 9 depicts a block diagram of a computer system for the blade pitch control system of FIGS. 1-5, capable of implementing methods for reducing loads induced by ocean waves on a floating wind turbine of FIGS. 6-8, in accordance with embodiments of the present invention.

FIG. 9 depicts a block diagram of a computer system for the blade pitch control system 100, 100' of FIGS. 1-5, capable of implementing methods for reducing loads induced by ocean waves on a floating wind turbine of FIGS. 6-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for reducing loads induced by ocean waves on a floating wind turbine in the manner prescribed by the embodiments of FIGS. 6-8 using the blade pitch control system 100, 100' of FIGS. 1-5, wherein the instructions of the computer code 597 may be executed by processor 591 via memory device 595. The computer code 597 may include software or program instructions that may implement one or more algorithms for implementing the method for reducing loads induced by ocean waves on a floating wind turbine, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 2.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to assisted learning with a portable computing device. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to reduce loads induced by ocean waves on a floating wind turbine. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for reducing loads induced by ocean waves on a floating wind turbine. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for reducing loads induced by ocean waves on a floating wind turbine.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method for reducing floating wind turbine loads induced by ocean waves, the method comprising:
adjusting a blade pitch angle of at least one rotor blade of a floating wind turbine according to a pitch offset signal converted from an error signal defined by a difference between a tower bottom moment and a thrust moment.

2. The method of claim 1, wherein the adjusting the blade pitch angle minimizes a moment imbalance at a platform top of a floating wind turbine caused by ocean wave activity.

3. The method of claim 1, wherein the tower bottom moment is a moment at a platform top of the floating wind turbine as a result of environmental loads, and the thrust moment is a moment defined by a thrust force of rotor blades of the floating wind turbine measured at a location on the shaft of the floating turbine proximate the platform top.

4. The method of claim 1, further comprising: filtering the error signal using a bandpass filter in a frequency range attributable to ocean wave activity to obtain a filtered error signal.

5. The method of claim 4, wherein the filtering isolates wave excitation frequencies from the error signal that are in the frequency range defined by an ocean wave spectrum.

6. The method of claim 4, wherein the blade pitch angle is adjusted according to a pitch offset signal converted from the filtered error signal.

7. The method of claim 6, wherein the pitch offset signal is converted from the filtered error signal by calculating a difference between an actual pitch angle value of at least one rotor blade and a desired blade pitch angle of at least one rotor blade, wherein the difference defines the pitch offset signal.

8. A method for reducing loads induced by ocean waves on a floating wind turbine, the method comprising:
- filtering, by the processor, an error signal in a frequency range attributable to ocean wave activity to eliminate frequencies contributing to the error signal that are not attributable to ocean wave activity, resulting in a filtered error signal, wherein the error signal is a difference between a value associated with a tower bottom moment, which is a moment at a platform top of the floating wind turbine as a result of environmental loads, and a value associated with a thrust moment, which is a moment defined by a thrust force of rotor blades of the floating wind turbine at a location at a tower section of the floating turbine proximate the platform top;
- converting, by the processor, the filtered error signal to a pitch offset signal; and
- adjusting, by the processor, a blade pitch angle of at least one rotor blade of the floating wind turbine according to the pitch offset signal.

9. The method of claim 8, wherein the thrust force of rotor blades of the floating wind turbine is measured at the location at the tower section of the floating turbine proximate the platform top.

10. The method of claim 8, wherein the error signal comprises frequencies attributable to one or more of: turbulence due to wind above sea level, ocean wave activity, ocean current variability, vortex induced vibrations, structural resonances, electrical grid phenomena, and normal turbine operations.

11. The method of claim 8, wherein the error signal is filtered using a bandpass filter tuned to filter out frequencies above or below the frequency range attributable to ocean wave activity.

12. The method of claim 11, wherein the frequency range attributable to ocean wave activity is defined by an ocean wave frequency spectrum in a range of approximately 0.03 Hz to 0.25 Hz.

13. The method of claim 8, wherein the converting the filtered error signal to the pitch offset signal includes calculating a difference between an actual pitch angle value of at least one rotor blade and a desired blade pitch angle of at least one rotor blade, wherein the difference defines the pitch offset signal.

14. The method of claim 8, wherein the pitch offset signal is calculated from the filtered error signal according to a function with the following properties:
- a term proportional to a current value of the filtered error signal;
- a term proportional to a time integral of the filtered error signal; and
- a term proportional to a time derivative of the filtered error signal.

15. A computer system, comprising:
- a processor;
- a memory device coupled to the processor;
- a pitch controller coupled to the processor; and
- a computer readable storage device coupled to the processor, wherein the storage device contains program code executable by the processor via the memory device to implement a method for reducing loads induced by ocean waves on a floating wind turbine tower, the method comprising:
    - filtering, by the processor, an error signal in a frequency range attributable to ocean wave activity to eliminate frequencies contributing to the error signal that are not attributable to ocean wave activity, resulting in a filtered error signal, wherein the error signal is a difference between a value associated with a tower bottom moment, which is a moment at a platform top of the floating wind turbine as a result of environmental loads, and a value associated with a thrust moment, which is a moment defined by a thrust force of rotor blades of the floating wind turbine at a location at a tower section of the floating turbine proximate the platform top;
    - converting, by the processor, the filtered error signal to a pitch offset signal; and
    - adjusting, by the processor, a blade pitch angle of at least one rotor blade of the floating wind turbine according to the pitch offset signal.

16. The computer system of claim 15, wherein the thrust force of rotor blades of the floating wind turbine measured at the location at the tower section of the floating turbine proximate the platform top.

17. The computer system of claim 15, wherein the error signal is filtered using a bandpass filter tuned to filter out frequencies above or below the frequency range attributable to ocean wave activity, further wherein the frequency range attributable to ocean wave activity is defined by an ocean wave frequency spectrum in a range of approximately 0.03 Hz to 0.25 Hz.

18. The computer system of claim 15, wherein the converting the filtered error signal to the pitch offset signal includes calculating a difference between an actual pitch angle value of at least one rotor blade and a desired blade pitch angle of at least one rotor blade, wherein the difference defines the pitch offset signal.

19. A computer program product, comprising a computer readable hardware storage device storing a computer readable program code, the computer readable program code comprising an algorithm that when executed by a computer processor of a computing system implements a method according to claim 15.

* * * * *